Oct. 22, 1957  L. A. CARRIOL ET AL  2,810,495
METHOD AND APPARATUS FOR DISTRIBUTING A MIXTURE
OF SEVERAL LIQUIDS
Filed Aug. 4, 1954  10 Sheets-Sheet 1

INVENTORS:
LOUIS-AUGUSTE CARRIOL,
LAWRENCE A. MOUNTFORD
& IRENE J. MOUNTFORD

BY

Oct. 22, 1957　　　L. A. CARRIOL ET AL　　　2,810,495
METHOD AND APPARATUS FOR DISTRIBUTING A MIXTURE
OF SEVERAL LIQUIDS
Filed Aug. 4, 1954　　　　　　　　　　　10 Sheets-Sheet 5

INVENTORS:
LOUIS AUGUSTE CARRIOL,
LAWRENCE A. MOUNTFORD
& IRENE J. MOUNTFORD

INVENTORS:
LOUIS AUGUSTE CARRIOL
LAWRENCE A. MOUNTFORD
& IRENE J. MOUNTFORD

Oct. 22, 1957   L. A. CARRIOL ET AL   2,810,495
METHOD AND APPARATUS FOR DISTRIBUTING A MIXTURE
OF SEVERAL LIQUIDS
Filed Aug. 4, 1954   10 Sheets-Sheet 10

INVENTORS:
LOUIS AUGUSTE CARRIOL
LAWRENCE A. MOUNTFORD
& IRENE J. MOUNTFORD

United States Patent Office 2,810,495
Patented Oct. 22, 1957

2,810,495

METHOD AND APPARATUS FOR DISTRIBUTING A MIXTURE OF SEVERAL LIQUIDS

Louis Auguste Carriol, Aulnay-sous-Bois, France, and Lawrence A. Mountford and Irene J. Mountford, Chingford, England, assignors to S. A. T. A. M., Societe Anonyme pour Tous Appareillages Mecaniques, La Courneuve, France Application August 4, 1954, Serial No. 447,845

Claims priority, application Great Britain August 6, 1953

16 Claims. (Cl. 222—1)

An object of the present invention is first of all a method for distributing a mixture of two liquids, consisting in adding to the first constituent liquid of this mixture a previously metered amount of a second liquid which is also a constituent of this mixture, in introducing said second liquid into the first liquid, in metering the mixture thus obtained and then distributing it.

Another object of the present invention is a liquid metering and distributing apparatus for the realisation of the above described process, said apparatus being characterized by the fact that it comprises a metering chamber for receiving the mixture to be distributed, means for metering the amount of the second liquid which it is desired to add to the first liquid for obtaining a mixture, the capacity of which corresponds to that of said metering chamber, means for introducing said metered amount of the second liquid into the first liquid before its entrance in the metering chamber and means for sending the two liquids thus mixed from the metering chamber to the container intended for receiving them.

The present invention may be realized by various arrangements of the kind of that described in the above paragraph, said arrangements being described in the rest of the present description or in the claims following it and/or represented in the appended drawing.

By way of examples only, the appended drawings represent in.

Figure 1:
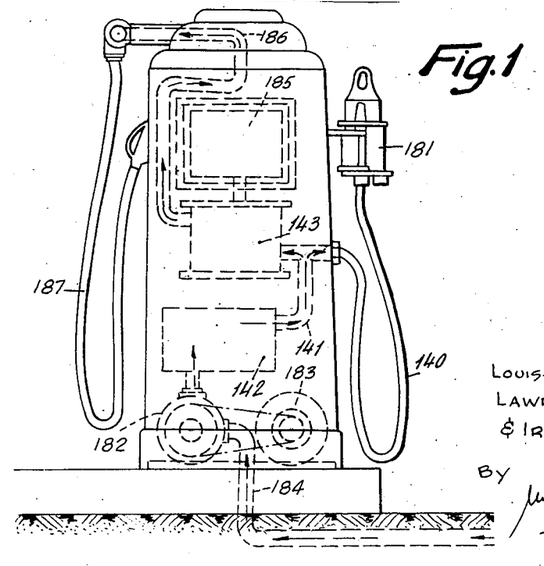
Figure 1 an assembly view of a gasoline metering and distributing apparatus provided with a first embodiment of a mixing device according to the present invention.

A first embodiment of the present invention is shown in Figs. 1–5. Fig. 1 shows a schematic view of a gasoline metering and distributing apparatus 180 of known type on which a mixing device 181 according to the present invention is mounted. The apparatus comprises further a pump 182 drvien by a motor 183. The pump 182 draws gasoline from an underground reservoir (not shown) through a conduit 184 and feeds this gasoline into a separator 142 and from there through the conduit 141 into the measuring device 143 actuating thereby an indicator 185. The gasoline passes from the measuring device 143 into a conduit 186 ending into a flexible hose 187.

The mixing device 181 is connected to the measuring device 143 by means of a flexible hose 140 the end of which is connected to the conduit 141 between the separator 142 and the measuring device 143.

By this arrangement it is possible to discharge from the hose 187 either pure gasoline or a mixture of gasoline and oil produced by the device 181. An embodiment of the mixing device of the present invention is shown in detail in Figs. 2–5 and 1 designates the body of the device, obtained in a suitable manner by moulding or stamping and provided with an entrance 2, intended to be connected with a flexible hose, capable of supplying gasoline under pressure.

Figure 2:
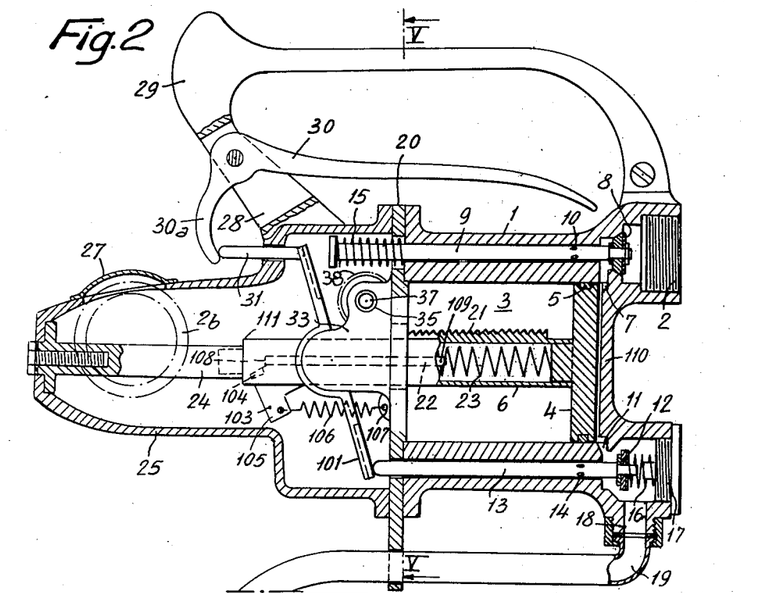
Figure 2 is a partially sectional side view of the metering cylinder of said device.
Figure 3:
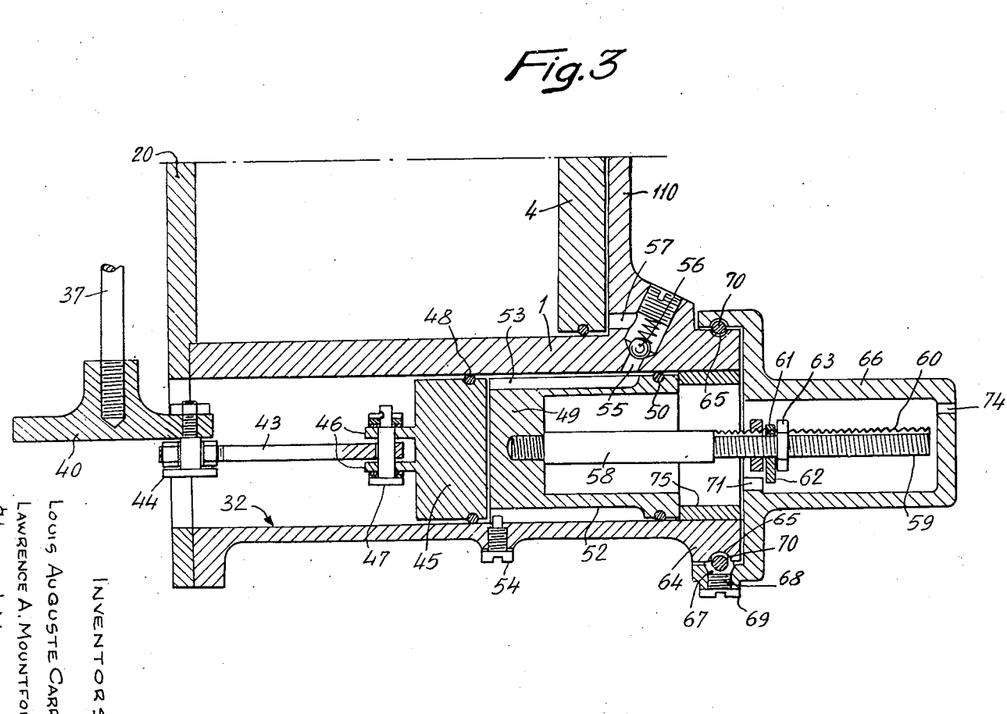
Figure 3 a section of the pump for lubricant in this device, the section being taken along the line III—III of Fig. 4.
Figure 4:
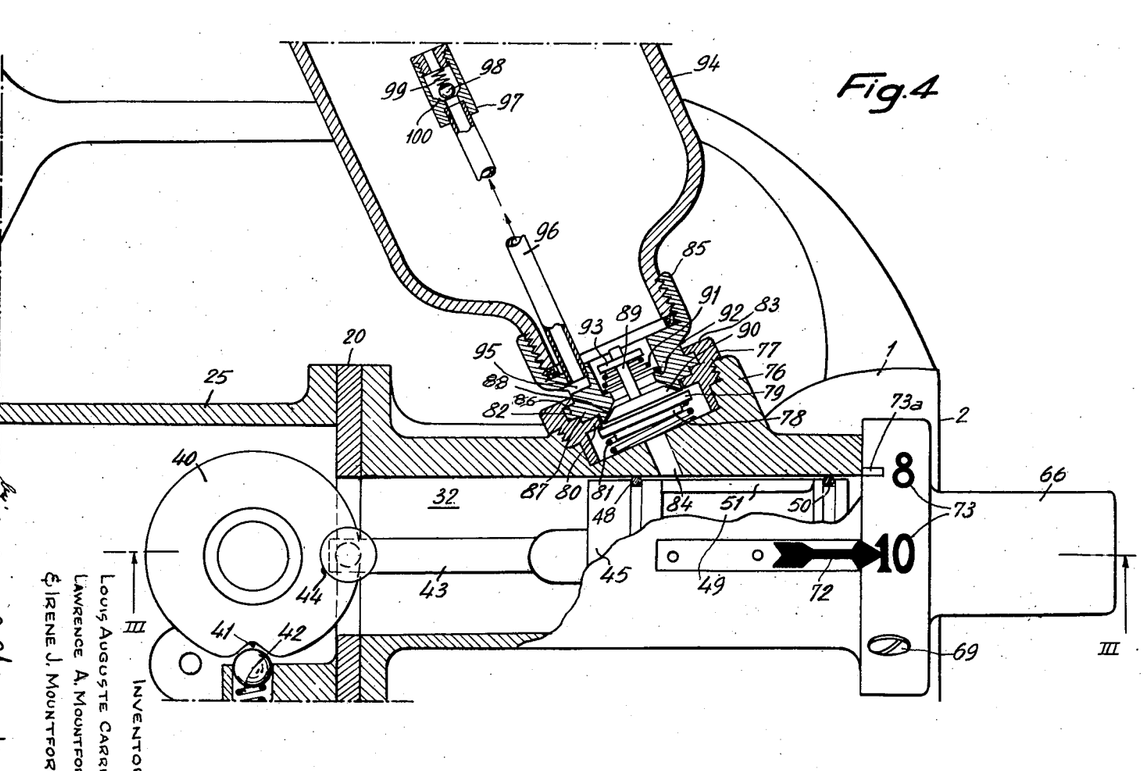
Figure 4 a vertical section of said pump, the section being taken along the line IV—IV of Fig. 5.

There is provided in the body 1, in addition, a cylindrical hole 3 which forms the metering chamber and in which a piston 4 slides, constituting the metering piston and provided with an annular sealing gasket 5, and a tubular piston rod 6.

The end of the cylindrical hole 3, which is adjacent the entrance 2 comprises a passage 7, in communication through the valve 8 with the entrance 2. The valve 8 is provided with a control shaft capable of sliding inside a suitable bore of the body 1 and substantially parallel with the piston rod 6. A liquid tight ring 10 prevents any flow from the entrance 2 towards this bore.

The body 1 is further provided with an outlet hole 11 controlled by a valve 12, operated by a rod 13 which can slide in a bore of said body and provided with a ring 14 which is liquid tight.

The intake valve 8 is biased towards its closed position by a spring 15 bearing on the widened end of the rod 9. The outlet valve 12 is urged towards its closed position by a spring 16 bearing on the face of the valve and on a plug 17 for closing the chamber in which the outlet valve 12 is housed.

The chamber of the outlet valve 12 is provided with a discharge aperture 18 designed for receiving a distribution hose or a similar duct 19 which may conveniently be made out of a transparent material so as to make it possible to see by transparence the condition of the drain.

The body 1 is provided with an end cover 20, suitably drilled for the passage of the piston rod 6 and valve operating rods 9 and 13 through the cover. The piston rod 6 is provided with gear rack 21 and an elongated key or protuberance 22. Located within the tubular piston rod 6 is a helical spring 23 bearing at one end on the rear face of the piston 4 and at the other end on a rod 24 which is arranged to operate slidably and telescopically in the piston rod 6.

The rod 24 is attached to the nose assembly cover 25 which also contains the counter 26 adapted to count and record the complete strokes made by piston 4 and rod 6, the counter 26 being visible through window 27.

The nose assembly cover 25 is further provided with a lug 28 attaching handle 29 on which operating lever 30 is pivoted, the nose 30a of which bears on trigger rod 31 slidably arranged in a bore in the nose assembly cover 25.

The body 1 (see Figures 3 and 4) is further provided with an extension having a cylinder bore 32 containing and partly comprising the variable volume pump for lubricating oil. The cover plate 20 is provided with bosses 33 and 34 (Fig. 5) drilled to take bearings 35 and 36 in which shaft 37 is rotatably mounted.

Figure 5:
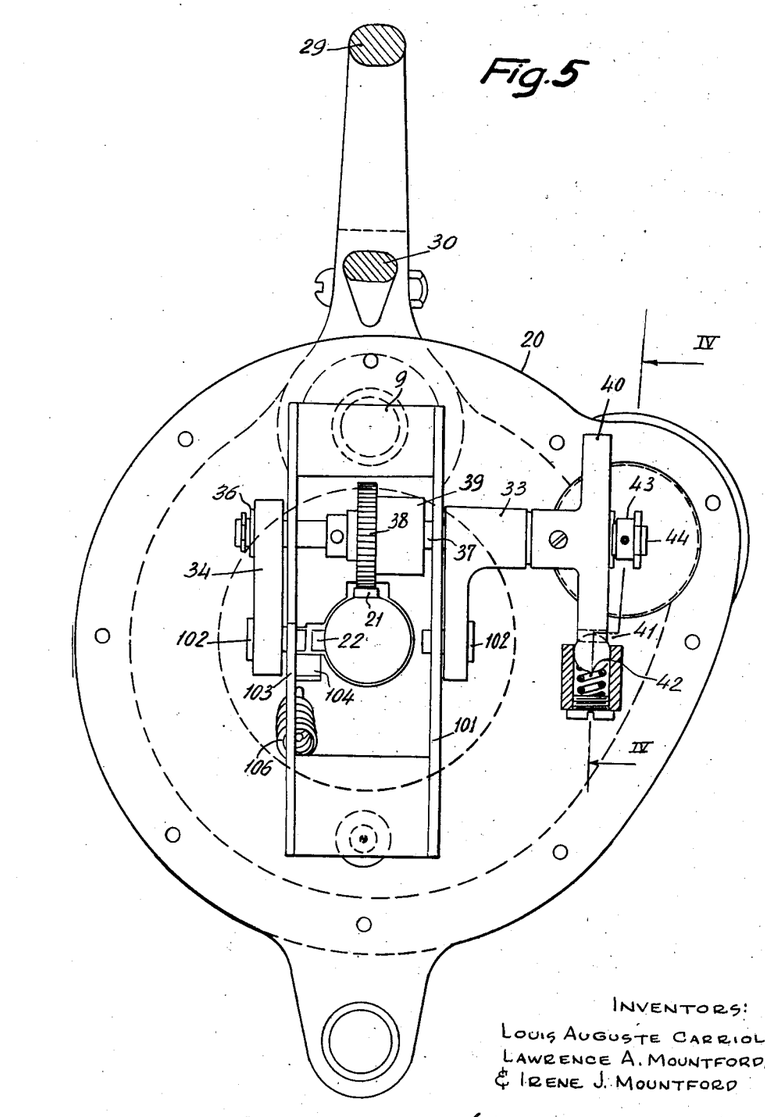
Figure 5 a section along the line V—V of Figure 2.

The shaft 37 is provided with a gear wheel 38 cooperating with the gear-rack 21 in such a manner that during the stroke of piston 4 and rod 6 the rack 21 rotates wheel 38, the gear ratio being arranged that wheel 38 rotates precisely one revolution during one single outward stroke of rod 6. Motion of gear wheel 38 is however transmitted to rod 37 via ratchet and pawl mechanism 39 by which rotational motion is only transmitted to shaft 37 during the outward stroke of piston 4 and rod 6 from a position adjacent to inlet port 2 towards end cover 20, the gear wheel 38 free-wheeling during the return stroke of piston 4 and rod 6 towards inlet port 2.

The shaft 37 transmits this unidirectional rotational motion to wheel 40 (Figure 5) which is provided in its periphery with a recess 41 which co-operates with a spring located ball detent 42 arranged so as to hold wheel 40 stationary when free-wheel device 39 is operating on the return-stroke of piston rod 6, but so as to permit wheel 40 to rotate when free-wheel device 39 is in the locked position during the outward stroke of piston rod 6.

Attached to wheel 40 is one end of a piston rod 43 free to rotate about pin 44. The other end of piston rod 43 is attached to oil pump piston 45 by lugs 46 and pin 47.

The piston 45 operates slidably in the cylinder 32 and is provided with liquid sealing ring 48.

Slidably located in the end of cylinder 32 remote from piston 45 is a piston 49 provided with a liquid sealing ring 50 and three longitudinal grooves 51, 52 and 53 extending from the face of the piston to a point just before sealing ring 50. These grooves are displaced 90° to each other. A set screw 54 projects into groove 52, permitting reciprocating movements but preventing rotational motion of piston 49 in cylinder bore 32.

The groove 53 in piston 49 communicates with a bore 55 in the cylinder bore. This bore 55 communicates with a non-return valve 56 adapted to permit fluid flow from cylinder bore 32 but to prevent fluid flow in the reverse direction.

The non-return valve 56 communicates with cylinder bore 3 by way of a bore 57 through the end wall of cylinder 3 remote from end plate 20. The piston 49 is further provided with a rod 58, formed with a screw thread 59 over a considerable length of its free end and provided with a flap 60.

Adapted to fit rod 58 are stop washers 61 being substantially annular rings but with the centre hole of each provided with a flat to match flat 60 on rod 58 and with the periphery of each provided with a protruding lug 62. Various stop washers can be fitted to and locked on shaft 58 by means of nuts 63, each such stop washer having its protuberant lug 62 differently disposed in the angular sense to the flat 60.

The end of the body surrounding cylinder 32 adjacent to piston 49 is provided with external machined circular flange 64 in the periphery of which is provided groove 65 of substantially semi-circular cross sectional shape. Arranged to rotate over and about flange 64 is end cover 66 of cylindrical section adapted to extend over and surround the extremities of rod 58 and the stop washers 61 and nuts 63 thereon, the cylindrical section of end cover 66 being of relatively large diameter to fit over flange 64 and of substantially reduced diameter to fit over rod 58.

The interior periphery of end cover 66 is further provided with groove 67, also of substantially semi-circular cross sectional shape. At one point in the periphery of the end cover 66 is a tapped hole 68 extending through into groove 67 and provided with screwed plug 69.

Balls 70 are fed into grooves 65 and 67 through the hole 68 and the plug 69 is afterwards fitted. The end cap 66 is in this way rotationally affixed to the cylinder 32.

The end cap 66 is provided on its interior surface with protuberant lug 71 adapted to engage with the lug 62 on one or other of the stop washers 61 on the shaft 58 during forward motion of piston 49, but to miss engagement with the lugs on other stop washers which may be fitted to shaft 58, the selection of the lug engaged and therefore of the permitted travel of piston 49 towards piston 45, being determined by the rotation of end cap 66.

The external periphery of the end cap 66 at the larger diameter is provided with numerical markings 73 to indicate the percentage volume or measure of lubricating oil which is required to be mixed with the fuel, each of these markings corresponding to a specific stop washer 61 which will engage with lug 71 when the end cap 66 is turned to a position at which the numerical marking 73 concerned corresponds with pointer 72.

The pointer 72 is of the spring type and engages with grooves 73a in the periphery of the end cap 66 adjacent to each numerical marking 73 so providing positive location of end cap 66 at the marking selected.

The end cap 66 is drilled at 74 to allow full ingress and exit of atmospheric air during reciprocation of piston 49.

A stop ring 75 is provided within the cylinder bore 32 between the piston 49 and end cap 66 to limit the travel of said piston 49 in the direction toward the end cap 66.

The wall of cylinder 32 is provided with a boss 76 (Fig. 4) bored and threaded to a receive coupling member 77. This coupling member 77 incorporates a non-return valve 78 having a resilient face 79 urged against seat 80 by means of spring 81 and member 77 is also provided with bayonet type fastening ring 83 formed with slot 82. A hole 84 communicates between the chamber of non-return valve 78 and the interior of cylinder bore 32 at a point adjacent to the opposed faces of pistons 45 and 49 when the latter are both nearest to end cap 66. Adapted to connect to coupling member 77 is lubricating oil reservoir connector 85, provided with male bayonet lugs 86 engaging in the slot 82 in coupling member 77. Connector 85 is further provided with a male nose portion 87 adapted to fit precisely within the female recess provided by coupling member 77. This nose portion is of circular cross-section and contains a frusto-conical valve seat 88 so arranged that the wider end periphery of the conical valve seat recess and the periphery of nose portion 87 conjoin in a nearly knife-edged fashion as an annular ring capable of passing into the annular ring provided by seat 80 and of just bearing on the outer face of valve 79 when connector 85 is coupled to coupling 77.

Within the valve seat 88 is a valve 89 provided with resilient face 90 and urged to the closed position by spring 91 co-operating with seat 92 provided within the body of connector 85 and pin 93 passing through the spindle of valve 89. The face 90 of valve 89 is arranged to bear on the face 79 of valve 78 when connector 85 is coupled to coupling 77, and the action of both valves 89 and 78 is such that they will open in unison allowing free passage for fluid when a suction is applied by the lubricating oil pump and will close in unison against a fluid pressure applied by the lubricating oil pump or when the pump is idle.

Valve 78 is adapted to lock with bayonet recesses in body 77 until the rotation of connector 85 in respect of bayonets 82 and 83 during attachment of the oil reservoir releases it. Thus, if the connection of the oil reservoir is forgotten, excessive vacuum is created by the oil pump and the device is prevented from working.

The connector 85 is adapted at its other end to receive, and to be fitted in a liquid tight fashion to a lubricating oil reservoir 94 which may conveniently take the form of a transparent bottle made, for example, of plastic.

To allow the entry of atmospheric air into reservoir 94 to replace lubricating oil withdrawn via valve 89 and 78 by the oil pump, connector 85 is provided with air hole 95 leading to air tube 96 provided with valve 97 comprising a ball 98 urged by spring 99 into co-operation with seat 100. The action of this valve is to permit the entry of atmospheric air into reservoir 94 and to prevent the leakage of oil from reservoir 94.

To co-ordinate the operation of inlet valve 8 and exhaust valve 12 with the complete stroke of piston 4 and the complete stroke of the lubricating oil pump, link plate 101 is provided and pivoted on pivot pins 102 through the lugs 33 and 34 on end plate 20. The centre of link plate 101 is removed to allow free passage for piston rod 6 but the link plate 101 is adapted to bear in one position with one end on the end of inlet valve operating rod 9 and in the other position with the other end on the end of exhaust valve operating rod 13 as clearly shown in Figure 2.

The link plate 101 is further provided on one side with an extension 103, this extension carrying a lug 104 and being provided with hole 105 adapted to anchor one end of a spring 106, the other end of which is retained by boss 107 provided on end plate 20. The action of spring 106 is to urge the link plate 101 so that it pivots about pivot pins 102 in such a manner that the end adjacent to inlet valve rod 9 is urged away from this rod and is forced into contact with the trigger rod 31 thus urging trigger 30 into the "down" or "at rest" position.

The lug 104 on extension 103 of link plate 101 is adapted to co-operate with elongated key 22 on piston rod 6 in such a manner that when the trigger 30 is operated, to urge trigger rod 31 inwardly and to rock link plate 101 about pivots 102, the lug 104 describes an arc past the end 108 of key 22 and rises just above its top surface before the end of link plate 101 contacts piston rod 9 and opens inlet valve 8. Key 22 is of substantially the same length as the full stroke of piston 4 and the geometry of link plate 101 with its extension 103 and lug 104 moving about pivots 102 in relation to key 22 and the end of inlet valve operating rod 9 is such that inlet valve 8 cannot close before the piston 4 has moved the length of cylinder 3 and has with its rear face contacted the inner face of end plate 20.

Similarly, when piston 4 reaches end plate 20, lug 104 can pass the end 109 of key 22, allowing link plate 101 to pivot about pins 102 thus closing inlet 8 and opening exhaust valve 12 when trigger 30 is released.

The method of operation is as follows:

The inlet 2 is connected by means of a flexible tubular conduit such as a synthetic rubber hose to a convenient source of gasoline under a pressure of say, 12 to 30 pounds per square inch. This supply of gasoline may conveniently be arranged by connecting the flexible conduit to the delivery pipework between the air separator and the meter of a conventional electrically driven gasoline dispensing pump (see Figure 1).

A bottle 94 (Figure 4) fitted with connector 85 and containing the desired type of lubricating oil is selected and connected to the dispensing apparatus by inserting it in coupling 77. The desired quantity, in this case a percentage, of oil is selected by turning end cap 66 so that the desired numerical marking 71 is located at pointer 72. Delivery pipe 19 is inserted into the fuel tank of the engine which it is desired to refuel.

Pulling trigger 30 depresses trigger rod 31, rocking link 101 about pivots 102 against the tension of spring 106. Lug 104 describes an arc past the end of key 22 and rises just above it, and the other end of link plate 101 moves away from exhaust valve rod 13 permitting spring 16 to close valve 12. The top end of link plate 101 then bears against the end of inlet valve rod 9 and the final stage of pulling trigger 30 thus opens inlet valve 8, permitting gasoline under supply pressure to enter cylinder 3 and bear on the face of piston 4. The pressure on the face of piston 4 is sufficient to overcome and compress spring 23 and other resistances due to friction and the operation of the oil pump. Piston 4 and rod 6 are therefore urged along cylinder 3.

As the rack 21 is in engagement with the pinion gear wheel 38, the latter is rotated and as free-wheel 39 is in the locked position during the outward stroke of piston 4, the rotation of pinion wheel 38 is transmitted to shaft 37 and wheel 40.

The ratio of the full stroke of piston 4 in cylinder 3 and of rack 21 and pinion 38 is such that wheel 40 completes one full revolution during the full stroke of piston 4, and recess 41 returns to spring detent 42 at the completion of this revolution.

During the rotation of wheel 40 the oil pump piston 45 is caused to complete one withdrawal stroke and one inward stroke by means of piston rod 43.

During part of the withdrawal stroke of piston 45, piston 49 will also be drawn along cylinder 32 until one or other stop washer 62 engages with lug 71 on end cap 66, the particular washer concerned being determined by the selective position of end cap 66, at which moment piston 49 will be held. Piston 45 will then be drawn away from piston 49, the resultant suction drawing in lubricating oil from container 94 via valves 89 and 78 which are adapted to open under suction and close as soon as suction ends.

During part of the inward or return stroke of piston 45 a body of oil is trapped between pistons 45 and 49, piston 49 being carried backwards to stop ring 75. Valves 78 and 89 remain closed under pressure, and completion of the stroke of piston 45 forces the body of oil out of the oil pump via groove 53, bore 55, non-return valve 56 and bore 57 into cylinder 3, where it is intimately mixed with the gasoline entering from passage 7.

Cylinder 3 between the face of piston 4 and cylinder head 110 is now filled with a mixture of gasoline and lubricating oil of the required proportions and of a volume equivalent to the capacity of cylinder 3 between the face of piston 4 and the face of cylinder head 110, which can be any convenient measure such as, for example, one imperial pint or one litre.

During the outward or "changing" stroke, the lug 104 passes along the top of key 22, and the stroke can therefore not be interrupted even if trigger 30 is released. On completion of the stroke, however, key 22 is in a position where lug 104 can describe an arc past end 109 of key 22 when trigger 30 is released, thus permitting link plate 101, urged by spring 106, to pivot about pins 102, so first closing inlet valve 8 and then opening exhaust valve 12 by means of rods 9 and 13 respectively. Cylinder 3 between the faces of piston 4 and cylinder head 110 is thereby opened to the atmosphere and the pressure therein therefore falls to zero gauge pressure, permitting spring 23 to expand and so return piston 4 and piston rod 6 towards cylinder head face 110.

As soon as this inward stroke commences, the end 111 of piston rod 6 engages with the pawl on stroke counter 26 and registers one stroke, this being a convenient method of counting the individual volumes of gasoline and oil mixtures discharged.

The spring 23 urges piston 4 completely to the end of cylinder 3 until the piston face engages with cylinder head face 110, thereby totally evacuating all the gasoline and oil mixture via exhaust port 11 and delivery pipe 19.

During this inward or delivery stroke of piston 4, lug 104 passes below key 22, thus preventing depression of trigger 30, and interruption of the delivery, until the stroke and therefore total emptying of mixture from the cylinder is completed. Furthermore, during this inward or delivery stroke, free wheel 39 free wheels, thereby disengaging the drive of pinion gear wheel 38 from shaft 37 and leaving wheel 40 engaged by detent 42. The oil pump therefore remains inoperative.

This completes the cycle of events for one delivery of a unit measured volume of one particular blend of gasoline and oil mixture. A further unit measured volume can be delivered by again depressing and then releasing trigger 30, or alternative blends can be dispensed by changing container 94 for other containers holding different types of lubricating oil and also by selecting different proportions of oil by rotation of end cap 66.

It will be seen that the variations of grades of lubricating oil and the percentages in which they are introduced and blended into gasoline are virtually unlimited by the design of the apparatus.

Figure 6:
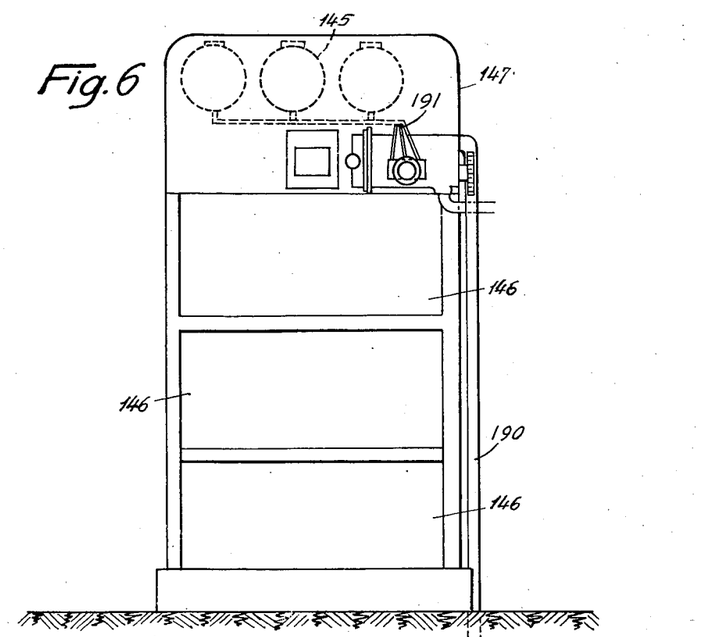
Figure 6 a schematic view of another arrangement of a gasoline metering and distributing apparatus according to the present invention.

Although the embodiment described concerns more particularly the application of the device as an attachment to a second supplementary hose attached to a gasoline dispensing pump, it is to be appreciated that the device is not limited or intended to be limited to this particular application. It may be conveniently mounted as shown in Fig. 6 on an independent cabinet 147 containing reservoirs 145 for the several types of lubricating oil required, selection of the desired grade of oil for a particular mixture being by means of any suitable selector valve 191 attached to the oil pump in place of coupling member 77. The supply of gasoline may be by means of a pump drawing from a separate reservoir, or by means of a conduit 190 from an existing pump and tank installation. As the device must be located at a sufficient height above ground level to ensure a flow of liquid by gravity into the fuel tank to be replenished, it is convenient to build in the base of the cabinet several compartments 146 for the storage and display of other products sold by the service station, such as motor lubricating oils etc.

Figure 7:
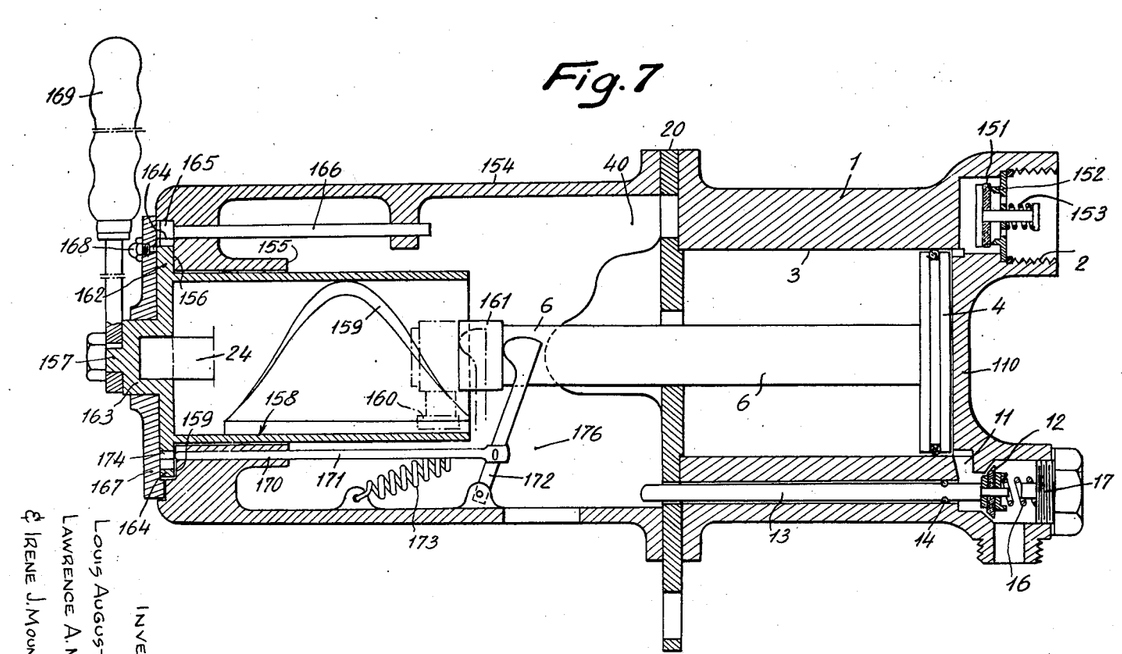
Figure 7 a section of a second embodiment of a mixing device according to the present invention.
Figure 8:
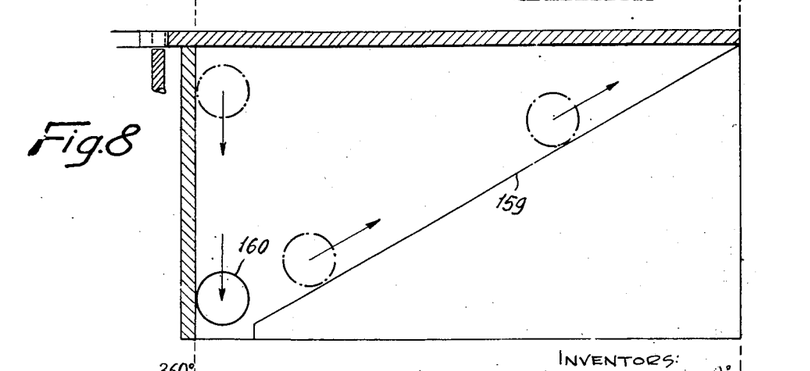
Figure 8 a flattened view of the cam of said device.

Further, the small volume of trade in gasoline and oil mixtures, or the absence of electrical supply and other factors may render appropriate an entirely manually operated version of the device. Figures 7 and 8 illustrate such a manually operated version of the apparatus.

Referring to Figure 7, the body 1, cover plate 20, piston 4, piston rod 6, shaft 24, spring 23, the drive to the oil pumy by means of rack 21, pinion wheel 38, free wheel 39, shaft 37 and wheel 40, the oil pump assembly complete, and the exhaust valve assembly 11, 12 and 16 are all substantially as heretofore described. Inlet valve 8, valve rod 9 and its bore and seal 10 are however omitted and are replaced by non-return valve 151 urged into cooperation with seat 152 by spring 153 in such a manner that fluid can pass into cylinder 3 but not out of the same.

The nose assembly cover 154 adapted to be attached to cover plate 20 is provided with sleeve and face bearings 155 and 156 adapted to receive and support a cam-sleeve assembly 157.

This cam-sleeve assembly 157 consists of a tubular portion 158 of somewhat greater length than the stroke of piston 4 in cylinder 3. Within this tubular portion and around its interior wall is provided camtrack 159 of a contour and arrangement substantially in accordance with Figure 8. Arranged to co-operate with cam-track 159 is cam follower 160 rotatably fixed to a bearing pin mounted on collar 161 attached to the extremity of piston rod 6.

The cam-sleeve assembly 157 is further provided with a circular plate portion 162 having a centre boss 163 which retain shaft 24. Plate portion 162 is provided with ratchet teeth 164 around its outer periphery, these teeth engaging with pawl 165 recessed in the nose cover assembly and forced into engagement with ratchet teeth 164 by a torsion rod 166 or by a suitable spring. Ratchet teeth 164 and pawl 165 combine to permit rotation of cam-sleeve assembly 157 in a direction which will cause cam-follower wheel 160 to mount cam-track 159 and to prevent rotation of cam sleeve assembly 157 in the opposite direction.

The cam-sleeve assembly 157 is rotatably mounted in sleeve and thrust bearings 155 and 156 in end cover 154 and retained by plate 167, lubrication of the bearings and the ratchet and pawl being accomplished by grease nipple 168. On its outer face boss 163 is adapted to receive a cranked operating handle 169. The wall of sleeve bearing 155 is provided with a bore 170 parallel with the wall of cam sleeve 157. In this bore is located lock-rod 171 pivotally attached at its end projecting beyond the bore to link 172, which is itself pivoted at one end to a bearing on the inside wall of end cover 154. The other fork end of link 172 is adapted to engage the end face of a collar 161 on piston rod 6.

The link 172 and lock rod 171 are urged upward by spring 173 in a direction tending to engage the end of lock rod 171 with circular plate 162 on cam sleeve assembly 157.

In circular plate 162 is provided an elongated hole 174 which will align, during rotation of cam sleeve assembly 157, with the bore 170 and lock rod 171 as piston 4 nears and reaches completion of its outward or charging stroke and commences its return or delivery stroke, that is as cam follower wheel 160 reaches the crest of cam track 159 and plunges down the vertical section of this track.

The counter 26, which is visible through the window 27 in end cover 154 is adapted to record the complete outward and return strokes of piston 4 and rod 6 as heretofore described. The method of operation is as follows:

The inlet port 2 is connected by means of pipework to a reservoir of gasoline. As before described, a container of the desired lubricating oil is attached to the coupling on the oil pump, and the desired proportion of oil to be introduced is selected by suitably positioning end cap 66.

At rest at the commencement of operation, the face of piston 4 is in contact with the face of cylinder head 110, both inlet valve 151 and exhaust valve 12 are closed, cam wheel 160 is at the bottom of cam track 159, collar 161 is engaging the fork end of link 172 and lock rod 171 is therefore withdrawn from hole 174 in plate 167.

The handle 169 is rotated (clockwise or toward the viewer in the drawing) thus rotating cam sleeve assembly 157 and causing cam follower wheel 160 to mount cam track 159, thereby drawing piston rod 6 and piston 4 outward from cylinder 3. It must be noted that piston 4 and rod 6 are prevented from rotational motion by key 22 and rack 21 sliding in suitable keyways in end plate 20.

The outward stroke of piston 4 draws gasoline into the cylinder 3 and at the same time the rack and pinion entrainment 21 and 38 between the piston rod 6 and the oil pump's drive causes the oil pump to suck in and then inject a portion of lubricating oil. Reversal of the direction of rotation of cam sleeve assembly 157 which would cause the outward stroke to be cut short, is prevented by pawl 165 engaging in ratchet teeth 164.

As the outward stroke of piston rod 6 takes place, collar 161 travels away from the fork end of link 172, which is urged by spring 173, thus bringing the top of lock rod 171 into contact with the underside of plate 162.

Immediately before the cam follower wheel 160 reaches the peak of cam track 159 piston 4 reaches the end of its stroke and abuts on the inner face of end plate 20, but slight additional rotation of the cam sleeve assembly 157 is permitted by the fact that cam follower wheel 160 has a resilient rubber centre, which compresses sufficiently to allow the wheel to ride over the cam peak and plunge down the vertical portion of the cam track. At this point hole 174 has aligned with the bore 170 permitting lock rod 171 to enter into hole 174 and to lock plate 162 and therefore the whole cam sleeve assembly, which must remain so locked until spring 23 has caused piston 4 and piston rod 6 to complete the return or discharge stroke.

During and throughout this discharge stroke, valve 151 closes by means of the spring 153 and by fluid pressure inside cylinder 3 while exhaust valve 12 is forced open by fluid pressure in cylinder 3 provided by spring 23. The action of the ratchet and pawl mechanism 164 and 165, coupled with locking mechanism 171 and 172 ensures that a complete outward and a complete inward stroke of the piston and piston rod 4 and 6 is always made, thus preventing inaccurate measurement and proportioning which would result from incompleted strokes.

As in the case of the automatic form of the device, the manually operated form can be mounted within a cabinet or on a stand containing reservoirs of gasoline and of the several desired grades or types of lubricating oils, selection of the latter being by a selector valve fitted to coupling 77.

In the third device represented in Figures 9 to 11, 201 designates a first metering cylinder, inside which a metering piston 202 can move. The volume of the cylinder is equal, for instance, to one litre. A pump 203 sucks gasoline stored in a tank (not shown) and forces it into a separator 204, then through a conduit 233 under the control of a three way cock 205 into the cylinder 201, pushing the piston 202 back until it comes against a stop 234. This piston 202 carries a rack 206 which gears with a toothed pinion 207 mounted free on a shaft 207a and going through a 360° revolution for a complete stroke of the rack 206. A cam 235 is associated with the pinion 207 and comprises a notch in which a pawl 208, mounted on a shaft 208a can fit roller 209 is also mounted on shaft 208a and the shafts 207a and 208a are interconnected by link 209a, in such a manner that the pinion 207 drives, by means of the cam 235 and pawl 208 the link 209a in one direction only. The assembly 207, 208, 208a and 209a constitutes a free wheel crank arm driven by the rack 206. On the other hand, the roller 209 enters the rectilinear U-shaped end 211a of a lever 211. The other end 211b of this lever 211 is in the shape of a circular arc and its cross section is also in the shape of a U which is engaged by one of the rollers 212 the position of which is adjustable and which acts as a fulcrum for the pivoting of the lever 211 as will be seen hereinafter. The rotation of the roller 209 thus causes the rocking of the lever 211 substantially around the roller 212. The rocking motion of the lever 211, thus obtained, displaces an auxiliary piston 213, moving inside an auxiliary cylinder 236. It should be noted that the piston 202 positively controls a back and forth motion of the piston 213 during its downward stroke and does not drive anything during its upward motion, due to the presence of the free wheel. The upper portion of the cylinder 236 is in communication, on the one hand, through a conduit 218 with the portion 233a of the conduit 233 located downstream of the cock 205 under the control of a delivery valve 217 and, on the other hand, with one of the oil tanks 216 or 231, under the control of a suction valve 214, and of a two way cock 215. The oil in the tank 216 or 231, which is in communication with the cylinder 236 is thus sucked into the latter when the piston 213 moves down and forced by the latter when it moves up, into the conduits 218 and 233a.

Figure 9:
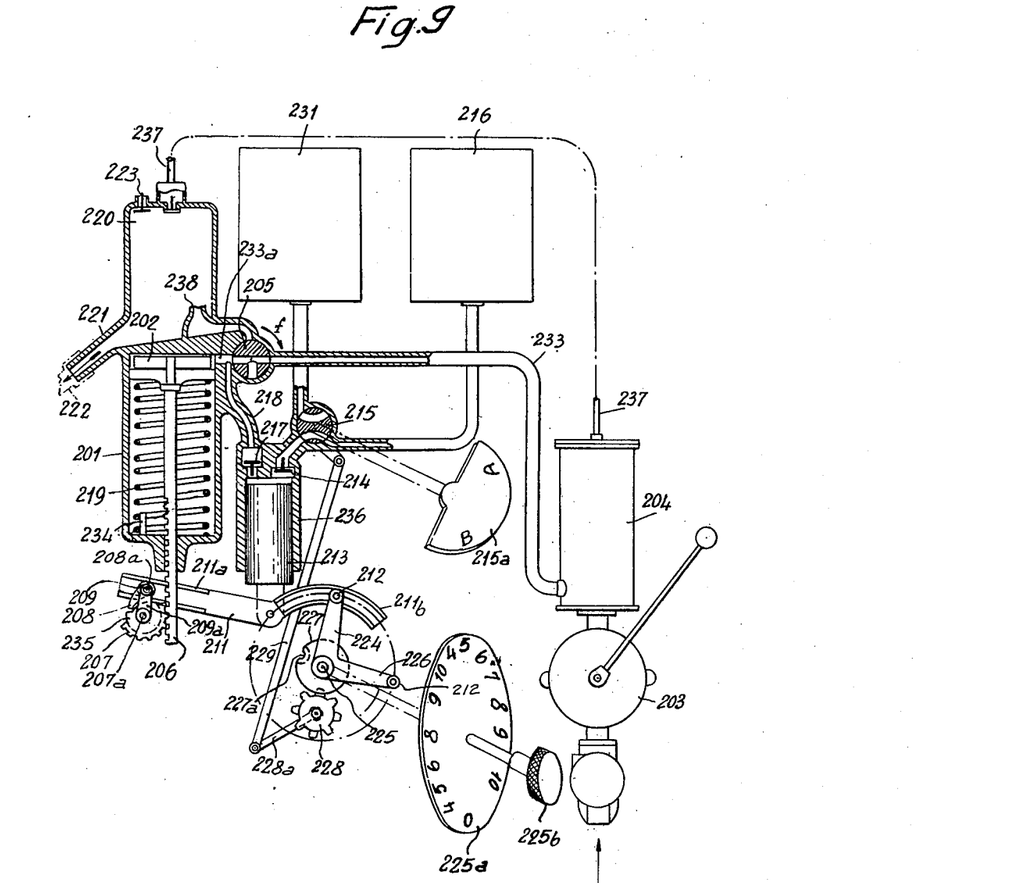
Figure 9 a section of a third embodiment of a mixing device according to the present invention.

A first mixture of the oil and gasoline is thus effected in the conduit 233a, before entering the metering cylinder 201. When the piston 202 comes against the stop 234, the cylinder 201 therefore contains one litre of a mixture of gasoline and oil. During this downward motion, the piston 202 compresses a spring 219. When the cock 205 has been rotated by 90° in the direction of the arrow f, and the operation of the pump 203 has stopped, the cylinder 201 is in communication with a container 220, a so-called pre-distribution container, the piston 202 moves up under the action of the spring 219 and forces the litre of mixture into the container 220 through a thin slot 238 which again stirs the mixture. The mixture which is in the container 220 flows through a connection 221 to a flexible hose 222, the free end of which has been introduced previously in the storage tank of a vehicle not shown. A suction valve 223 allows the entrance of air into the container 220 and a conduit 237 connects the air outlet of the separator 204 with the upper portion of the container 220.

It is quite obvious that the amplitude of the displacement of the piston 213, and consequently the amount of oil to be injected into one litre of the mixture, are functions of the position of the roller 212 since the amplitude of motion of the roller 209 is constant. This roller 212 is mounted on a lever 224 rotating about an axle 225, which may be operated from outside. The portion 211b of the lever 211 has the shape of a circular arc, the center of which is located on the axle 225. This lever 224, when coming out of the groove 211b of the lever 211 is replaced by a lever 226 keyed on the same axle 225 and having the same length as the lever 224. When the roller 212 of the lever 226 engages the groove 211b for replacing the lever 224, a lateral driver 227a of a cam 227 mounted on the axle 225 and associated with these levers 224 and 226 rotates the pinion 228 by a certain angle. The rotation of this pinion 228 causes a rotation of the cock 215 through the agency of a connecting rod 228a associated with the pinion 228 and of a rod 229 and consequently the cylinder 236 is placed in communication no longer with the tank 216 but with the tank 231. If the two tanks contain oils of different grades, it is thus possible to obtain mixtures of gasoline with one or the other of the oil grades. It should be noticed that during the whole time while one of the levers 224 or 226 is engaged in the grooves 211b, the lever 229 remains motionless since the groove 211b has the shape of a circular arc the center of which is on the axle 225. Similarly the rotation of the shaft 225 for adjusting the position of the roller 212 has no action on the lever 211 and consequently on the piston 213 which is at the top dead center. A mixing of oils of different grades is thus avoided, the conduit 218 being practically as small as possible.

For avoiding errors in metering, the rotation of the cock 205 must be prevented during the filling or draining of the metering cylinder 201, but it should be possible to operate this cock 205 when the piston 202 is at one of its extreme positions.

Two cams 240 and 250 are keyed on a shaft parallel with the axis of rotation of the cock 205 and controlling the latter by means of a ball not shown.

The first cam 240 is circular, and it comprises a notch 240a and a protrusion 240b. Further, two levers 241 and 243 are mounted free on a shaft 242 parallel with the one which carries the cams 240 and 250. The arm 241a of lever 241 cooperates with the rack 206 and enters a notch 206a in the low position of the piston 202 as may be seen in Figure 10. The other arm 241b of this lever 241 can come on the trajectory of the protrusion 240b only when the arm 241a is in the notch 206a. The arm 243a of the lever 243 can enter the notch 240a while the other arm 243b can be pushed by a stud 244 carried by the arm 241b. A spring 245 constantly tends to move the arms 241b and 243a closer together. Another spring 246 attached to the arm 241b tends to place the hook shaped end 241a in the notch 206a.

Figure 11:
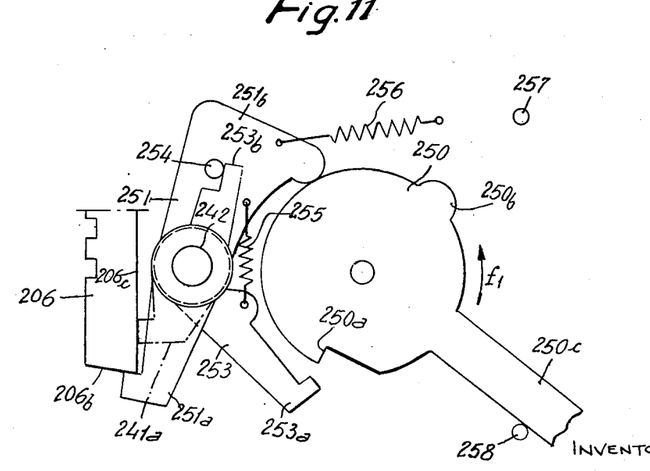

The second cam 250, like the cam 240, is circular and comprises a notch 250a and a protrusion 250b. The cam 250 is controlled by a lever 250c, the displacements of which are limited to 90° by stops 257 and 258. On the other hand, two levers 251 and 253 are mounted free on the shaft 242. The arm 251a cooperates with the rack 206 as may be seen from Figure 11. The other arm 251b of this lever 251 can come on the trajectory of the protrusion 250b only when the arm 251a is in the position shown in Figure 11. The arm 253a of the lever 253 can enter the notch 250a while the other arm 253b can be pushed by a stud 254 carried by the arm 251b. A spring 255 tends constantly to move the arms 251b and 253a closer together. Another spring 256 attached to the arm 251 tends to push the hook shaped arm 251a against the rack 206. In the extreme upper position of the piston 202, the arm 251a comes above the end 206b of the rack 206 and the arm 253a is held outside the notch 250a by the stop 254 as represented in Figure 11. The arm 251a prevents any downward motion of the rack 206 and consequently of the piston 202.

Figure 10:
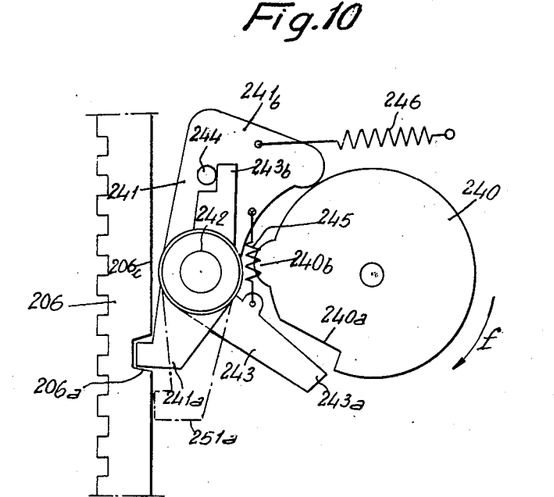
Figures 10 and 11 detail views of this third device.

On the other hand, the end 241 comes and abuts, under the action of the spring 246 against the edge 206c of the rack 206, as indicated in dash-dotted lines in Figure 11.

and the arm 243a comes and abuts against the circular portion of the cam 240. Nothing prevents the rotation of the shaft carrying the cams 240 and 250 and consequently the rotation of the cock 205 in the direction of the arrow $f_1$.

If under such conditions, the lever 250c is turned until it strikes the stop 257, the shaft of the cams 240 and 250 carries out a rotation of 90° in the direction of the arrow $f_1$ and the cock 205 comes in the position represented in Figure 9. Due to this rotation of the cams 240 and 250, the protrusion 250b pushes back the arm 251b and causes the arm 251a to escape from the end 206b of the rack 206, allowing the latter to move down, and the arm 243a falls into the notch 240a, in such a manner that the cock 205 cannot be moved backwards in the direction of the arrow $f$. The cock 205 also cannot be operated in the direction of the arrow $f_1$, since the stop 257 prevents any rotation of the lever 250c in this direction. The cock 205 is thus immobilized, but the rack 206 is released. The filling of the cylinder 201 thus takes place.

When the piston 202 comes and strikes the stop 234, the notch 206a comes opposite the arm 241a. The latter enters this notch 206a under the action of the spring 246. Due to the pivoting of the lever 241, the stop 244 rocks the lever 243 counterclockwise. The arm 243a therefore, escapes from the notch 240a. Nothing prevents any more the rotation of the cock 205 in the direction of the arrow $f$.

If the lever 250c is turned 90° in the direction of the arrow $f$ until it strikes the stop 258, the cock 205 is brought to a position which places the cylinder 201 in communication with the container 220. Due to this rotation, the protrusion 240b pushes back the arm 241b and the end 241a is moved out of the notch 206a. The rack 206 is thus released. The cylinder 201 can discharge therefore into the tank 5, but at the same time the arm 253a enters the notch 250a under the action of the spring 255 which prevents any rotation of the lever in the direction of the arrow $f_1$.

As soon as the discharge starts, the notch 206a is no longer in register with the hook 241a and the latter rests on the edge of the rack 206. Further, it is impossible to rotate the cams 240 and 250 and consequently the cock 205 due to the penetration of the arm 253a into the notch 250a and due to the abutting of the control arm 250c against the stop 258.

When the discharge has been completed the cycle starts again.

Thus the cock 205 can be operated only at extreme positions of the piston 202 and at the same time the piston 202 cannot effect two successive runs when the cock 205 has not been operated.

It should be mentioned further that a dial 225a, associated with the shaft 225 and controlled by a button 225b makes it possible to show from the outside which one of the levers 224 or 226 is in engagement with the portion 211b of the lever 211 and the percentage of the oil added to the gasoline. In addition, a disc 215a associated with the cock 215 indicates the type of oil which has been added to the gasoline.

It should be noticed that, for instance, a rotation by hand of the cock 205 in the direction of the arrow $f$ for bringing it to the position for filling the cylinder 201 may cock an elastic device which is released when the piston 202 comes and strikes the stop 234, which causes an automatic return of the cock 205 to the position which places the cylinder 201 in communication with the container 220.

Figure 12:
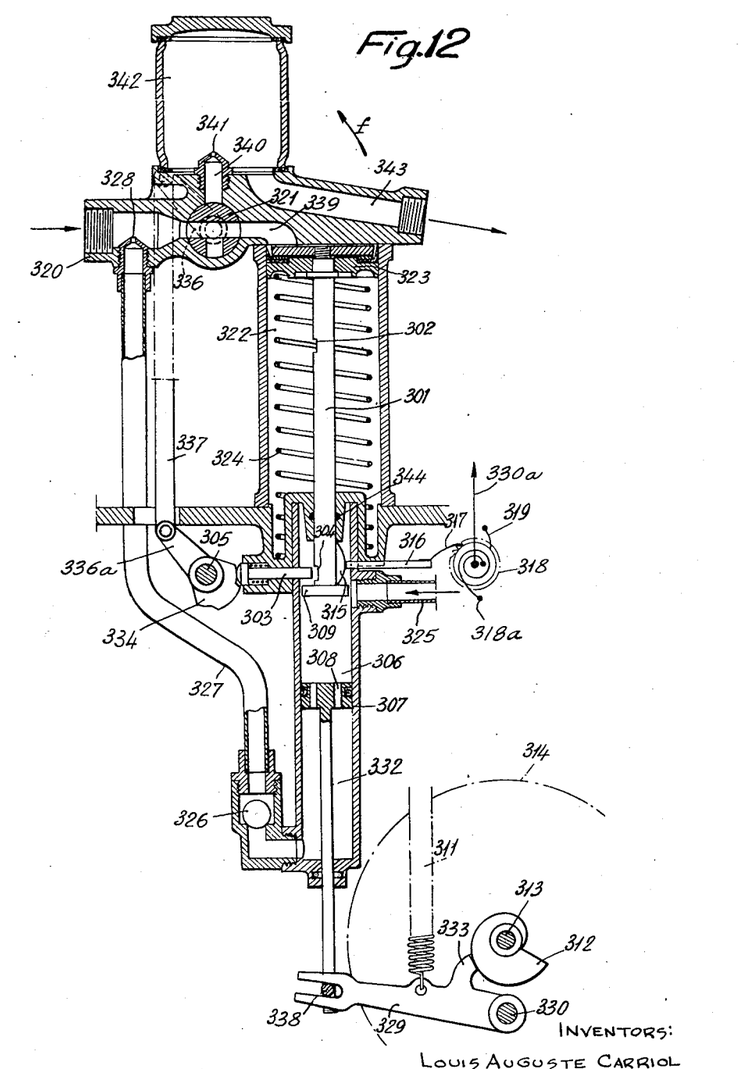
Figure 12 a longitudinal section of a fourth embodiment of a mixing device according to the present invention.

In the fourth device, represented in Figure 12, the gasoline arrives through a connection 320, goes through a three way cock 321, when it is in the position shown, and enters a metering cylinder 322 pushing back a piston 323 against the opposing action of a spring 324.

The oil stored in a tank, not shown, arrives, by gravity, through a connection 325 in an auxiliary cylinder 306, moves downwards therein, passing through the holes 308 of a piston 307, which divides the cylinder 306 into two compartments, goes through a check valve 326 at the outlet from the cylinder 306 and reaches through a conduit 327 an orifice 328 through which it enters the connection 320 and mixes with the gasoline.

Before the distribution, the piston 307 is displaced inside the cylinder 306 in such a manner that the amount of oil which is in the cylinder 306 above the piston 307 is equal to that which should exist in a volume of the mixture equal to the volume of the cylinder 322. This adjustment of the position of the piston 307 is obtained by the rotation of a shaft 313 on which a cam 312 is keyed. A lever 329 mounted for rocking about a fixed shaft 330 comprises a forked end between the prongs of which a stud 338 is engaged, associated with the rod 332 of the piston 307. A projection 333 is held against the periphery of the cam 312 by a spring 311 which, at the same time, at the end of the distribution, brings the piston 307 back to the position it occupied at the beginning of said distribution.

During the distribution, the piston 323 moves downwards, the rod 301 penetrating more and more into the cylinder 306. The lower end of this rod 301 carries a stopper 309 which eventually comes in contact with the piston 307, closing the holes 308 and then pushing this piston 307 thereby forcing the oil out of the lower compartment of the cylinder 306.

For avoiding metering errors and fraud, any operation of the cock 321 is prevented in all intermediate positions of the piston 323. To this effect, the rod 301 of the piston 323 carries two notches 302 and 304 so that one or the other of these notches is opposite a push-element 303 when the piston 323 is in one or the other of its extreme positions. A cam 334 associated with a shaft 305 carried by the casing of the apparatus prevents the push element 303 from coming out of one of the notches 302 or 304 except in two positions which correspond to the two regular positions of the cock 321 by means of a set of connecting rods 337 and arms 336 and 336a. Conversely, the push element 303 strikes against the edge of the rod 301 at all intermediate positions of the piston 323 and thus prevents any operating of the cock 321.

The rod 301 also carries a protrusion 315 which can push back a push element 316 which, by means of a pawl 317 drives a ratchet wheel 318 against the action of a spring 318a. A pawl 319 prevents any back motion of the wheel 318 which thus measures the number of fillings of the cylinder 322.

Thus the gasoline enters the cylinder 322 pushing back the piston 323, the rod 301 of which pushes, in the last portion of its run, the piston 307, and consequently the oil into the connection 320. When the cylinder 322 is entirely full it contains the amount of oil held in the lower compartment of the cylinder 306 and the amount of gasoline for completing the volume of the cylinder 322. The mixture obtained is the one desired.

When the filling has been completed, the notch 302 comes opposite the push element 303, the cock 321 can then be operated by 90° in the direction of the arrow $f$. In such a case, the mixture, under the action, first, of the two springs 311 and 324 then of the latter spring alone, is forced by the piston 323 into the duct 339 through the cock 321, the conduit 340 and the orifice 341 into the pre-distribution container 342 and then goes to the container to be filled, not shown, through the channel 343.

At the end of the discharge, the boss 315 causes the pointer 330a of the indicator associated with the wheel 318 to move one step forwards, and the notch 304 comes in front of the push element 303. The pistons 323 and 307 are thus back at their starting positions.

If it is desired to effect a new distribution, the piston 307 is brought, if necessary, to the desired position by rotating the shaft 313 in such a manner that a pointer (not shown) associated with the shaft 313 comes in front of the amount of oil to be mixed, and the cock 321 is brought to the position represented.

In the example represented in Figure 12 the notch 302 enters the auxiliary cylinder 306 and carries a little oil with it as it reenters the metering cylinder 322, hence a systematic oil loss. This drawback is avoided in case the engagement device 303, 334 represented in Figure 12 is replaced by a device as shown in Figures 13 and 14.

In the latter case, the rod 301 comprises, in the first case, two notches 302a and 304a but their distance, instead of being equal to the length of the run of the metering piston 223 is slightly greater. In addition the arrangement of these notches 302a and 304a is such that the notch 302a always remains above the packing 344 which prevents leakages of liquid between the rod 301 and the bottom of the metering cylinder 322 and that the notch 304a is always under this packing 344. The push element 303 is replaced by two push elements 303a and 303b guided axially by the bottom of the cylinder 322 and located respectively above and below the packing 344. These two push elements 303a and 303b are controlled by a cam 334a slightly different in shape from the cam 334 by means of a lever 345 on which the ends of the push elements 303a and 303b are articulated respectively at 346 and 347. A spring 335 tends to cause a pivoting of the lever 345 about one or the other of articulations 346 or 347 clockwise. This lever 345 comprises two projections 348 and 349 cooperating with the cam 334a and it is held by a rod 352.

Figure 13:
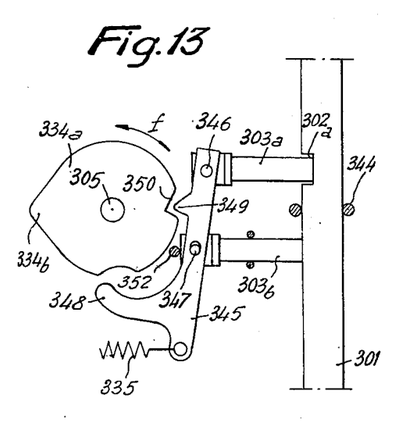
Figures 13 and 14 two positions of a modified embodiment of the mode of engagement of the device represented in Figure 12 and Figure 15 a gasoline metering and distributing apparatus provided with a device in accordance with that shown in Figure 12.
Figure 14:
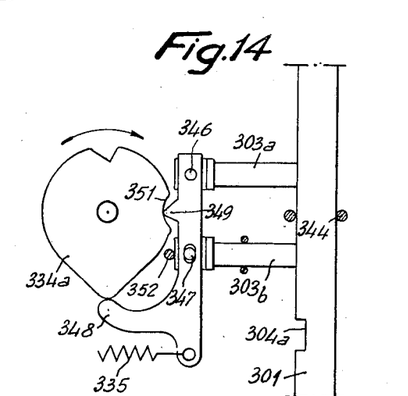

The operation is as follows:

When the metering piston 323 is in its low position, the engagement device is in the position represented in Figure 13, the push element 303a enters the notch 302a and the projection 349 is in register with the notch 350 of the cam 334a without entering it. The cock 321 can then be operated, which causes a rotation of the axle 305 and of the cam 334a in the direction of the arrow f. This cam 334a then comes to the position shown in Figure 14, and the portion 334b of the cam 334a pushes back, by acting on the projection 348, the lever 345 against the action of the spring 335. This lever 345 rocks about the pivot 347 and the projection 349 enters the notch 351 of the cam 334a. The push element 303a then moves out of the notch 302a. The rod 301 can move and the push element 303a comes and strikes against the left edge of the rod 301. It should be noted that in this position represented in Figure 14, the cock 321 cannot be operated, since the projection 349 cannot come out of the notch 351. When the discharge of the cylinder 322 is ended, the notch 304a comes in register with the push element 303b and the lever 345, under the action of the spring 335 rocks about 346 which is fixed. The projection 349 moves out of the notch 351, and the cock 321 can be rotated so as to bring it to the position represented in Figure 1 for a new metering.

Figure 15:
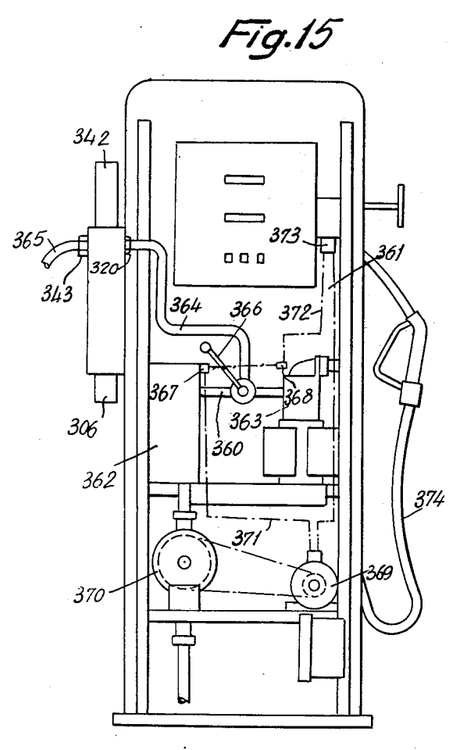

As stated above, the above described mixing apparatus can be either alone or combined with a metering and distributing apparatus for gasoline. One mode of embodiment for the latter case is represented in Figure 15. In this case, the connection 320 is connected through a conduit 364 with the distribution duct 360 of the gasoline metering and distributing apparatus 361, at a point in this conduit arranged between the separator 362 and metering element 363 of the apparatus 361, and the connection 343 is connected with a distribution pipe 365. A lever 366 controls the communication between the conduits 360 and 364. This lever 366, in the position of communication, acts on a switch 367 which is connected with the motor 369 of the pump 370 through a conductor 371. In the other position, the lever 366 acts on a switch 368 which is connected by a wire 372 with the switch box 373 of the apparatus 361, which controls the motor 369. Thus, in this case, the apparatus 361 can deliver gasoline only through the flexible hose 374.

We claim:

1. A process for delivering a predetermined volume of predetermined mixture of two fluids, comprising the steps of changing the volume of a metering chamber by drawing a first fluid into the same; causing said change in volume of said metering chamber to deliver into the latter a given volume of a second fluid simultaneously with the movement of said first fluid into said chamber thereby admixing the first and second fluids upon their entrance into said metering chamber; and discharging said metering chamber to deliver from said chamber a volume of fluid equal to the volume of said chamber and composed of said given volume of said second fluid mixed with said first fluid.

2. A process for delivering a predetermined volume of predetermined mixture of two fluids, comprising the steps of changing the volume of a metering chamber by drawing a first fluid into the same; causing said change in volume of said metering chamber to deliver into the latter a given volume of a second fluid simultaneously with the movement of said first fluid into said chamber; mixing said first and second fluids together before they enter said chamber; and discharging said metering chamber to deliver from said chamber a volume of fluid equal to the volume of said chamber and composed of said given volume of said second fluid mixed with said first fluid.

3. In an apparatus for delivering a predetermined volume of a predetermined mixture of two fluids, in combination, a metering chamber; volume changing means operatively connected to said metering chamber for increasing and decreasing the volume thereof; conduit means communicating with said metering chamber for delivering a first fluid thereto during an increase in the volume of said chamber and for discharging a fluid from said chamber during a decrease in the volume thereof; fluid moving means communicating with said chamber for delivering into the latter a given volume of a second fluid during an increase in the volume of said metering chamber; and actuating means interconnecting said volume changing means and fluid moving means for actuating the latter when said volume changing means increases the volume of said metering chamber.

4. In an apparatus for delivering a predetermined volume of a predetermined mixture of two fluids, in combination, a metering chamber; volume changing means operatively connected to said metering chamber for increasing and decreasing the volume thereof; a conduit communicating with said metering chamber for delivering a first fluid thereto during an increase in the volume of said chamber; fluid moving means communicating with said conduit for delivering into the latter a given volume of a second fluid which mixes in said conduit with said first fluid and moves with the latter into said metering chamber during an increase in the volume thereof; and actuating means interconnecting said volume changing means and fluid moving means for actuating the latter when said volume changing means increases the volume of said metering chamber.

5. In an apparatus for delivering a predetermined volume of a predetermined mixture of two fluids, in combination, a metering chamber; volume changing means operatively connected to said metering chamber for increasing and decreasing the volume thereof; conduit means communicating with said metering chamber for delivering a first fluid thereto during an increase in the volume of said chamber and for discharging a fluid from said chamber during a decrease in the volume thereof; pump means communicating with said chamber for delivering into the latter a given volume of a second fluid during an increase in the volume of said metering chamber; and actuating means interconnecting said volume changing means and pump means for actuating the latter when said volume changing means increases the volume of said metering chamber.

6. In an apparatus for delivering a predetermined volume of a predetermined mixture of fluids, in combination, a metering cylinder; conduit means communicating with one end of said metering cylinder for delivering a first fluid into the latter and for leading a mixture of fluids away from the latter; a metering piston movable in said metering cylinder from one end position at said one end of said cylinder away from said one end position to an opposite end position and back to said one end position; moving means operatively connected to said metering piston for moving the same from said one end position to said opposite end position thereof; spring means operatively engaging said metering piston for returning the latter from said opposite to said one end position; a pump cylinder communicating with said one end of said metering cylinder; a pump piston slidable in said pump cylinder; transmission means interconnecting said metering piston and said pump piston for transmitting movement of said metering piston to said pump piston and for moving the latter through its intake and discharge strokes while said metering piston moves from said one end position to said opposite end position thereof, whereby a given volume of a second fluid may be drawn into said pump cylinder and discharged from the latter into said metering cylinder to mix with said first fluid therein, while the mixture of fluids is discharged from said metering cylinder during movement of said metering piston from said opposite end position thereof to said one end position.

7. In an apparatus for delivering a predetermined volume of a predetermined mixture of fluids, in combination, a metering cylinder; conduit means communicating with one end of said metering cylinder for delivering a first fluid into the latter and for leading a mixture of fluids away from the latter; a metering piston movable in said metering cylinder from one end position at said one end of said cylinder away from said one end position to an opposite end position and back to said one end position; moving means operatively connected to said metering piston for moving the same from said one end position to said opposite end position thereof; spring means operatively engaging said metering piston for returning the latter from said opposite to said one end position; a pump cylinder communicating with said one end of said metering cylinder; a pump piston slidable in said pump cylinder; transmission means interconnecting said metering piston and said pump piston for transmitting movement of said metering piston to said pump piston and for moving the latter through its intake and discharge strokes while said metering piston moves from said one end position to said opposite end position thereof, whereby a given volume of a second fluid may be drawn into said pump cylinder and discharged from the latter into said metering cylinder to mix with said first fluid therein, while the mixture of fluids is discharged from said metering cylinder during movement of said metering piston from said opposite end position thereof to said one end position; and adjusting means co-operating with said pump cylinder and pump piston for regulating the amount of said second fluid which is delivered to said metering cylinder.

8. In an apparatus for delivering a predetermined volume of a predetermined mixture of fluids, in combination, a metering cylinder; conduit means communicating with one end of said metering cylinder for delivering a first fluid into the latter and for leading a mixture of fluids away from the latter; a metering piston movable in said metering cylinder from one end position at said one end of said cylinder away from said one end position to an opposite end position and back to said one end position; moving means operatively connected to said metering piston for moving the same from said one end position to said opposite end position thereof; spring means operatively engaging said metering piston for returning the latter from said opposite to said one end position; a pump cylinder communicating with said one end of said metering cylinder; a pump piston slidable in said pump cylinder; transmission means interconnecting said metering piston and said pump piston for transmitting movement of said metering piston to said pump piston and for moving the latter through its intake and discharge strokes while said metering piston moves from said one end position to said opposite end position thereof, whereby a given volume of a second fluid may be drawn into said pump cylinder and discharged from the latter into said metering cylinder to mix with said first fluid therein, while the mixture of fluids is discharged from said metering cylinder during movement of said metering piston from said opposite end position thereof to said one end position; and adjusting means operatively connected to said pump cylinder for regulating the volume thereof to regulate the volume of said second fluid which is delivered to said metering cylinder.

9. In an apparatus for delivering a predetermined volume of a predetermined mixture of fluids, in combination, a metering cylinder; conduit means communicating with one end of said metering cylinder for delivering a first fluid into the latter and for leading a mixture of fluids away from the latter; a metering piston movable in said metering cylinder from one end position at said one end of said cylinder away from said one end position to an opposite end position and back to said one end position; moving means operatively connected to said metering piston for moving the same from said one end position to said opposite end position thereof; spring means operatively engaging said metering piston for returning the latter from said opposite to said one end position; a pump cylinder communicating with said one end of said metering cylinder; a pump piston slidable in said pump cylinder; transmission means interconnecting said metering piston and said pump piston for transmitting movement of said metering piston to said pump piston and for moving the latter through its intake and discharge strokes while said metering piston moves from said one end position to said opposite end position thereof, whereby a given volume of a second fluid may be drawn into said pump cylinder and discharged from the latter into said metering cylinder to mix with said first fluid therein, while the mixture of fluids is discharged from said metering cylinder during movement of said metering piston from said opposite end position thereof to said one end position; and adjusting means operatively connected to said transmission means for adjusting the stroke of said pump piston to regulate the volume of said second fluid which is delivered to said metering cylinder.

10. In an apparatus for delivering a predetermined volume of a predetermined mixture of fluids, in combination, a pair of cylinders; a pair of pistons respectively slidable within and surrounded by said cylinders; transmission means interconnecting said pistons for transmitting the movement of one of said pistons to the other of said pistons, for moving said other piston through its suction and pressure strokes while said one piston moves through its suction stroke, and for maintaining said other piston stationary while said one piston moves through its pressure stroke; a pair of supply means respectively communicating with said cylinders for supplying a pair of different fluids thereto during the suction strokes of said pistons; first conduit means communicating with both of said cylinders for delivering the fluid discharged during the pressure stroke of said other piston into the cylinder surrounding said one piston during the suction stroke of the latter; and second conduit means communicating with said latter cylinder for leading the mixture of fluids away from said latter cylinder during the pressure stroke of said one piston while said other piston remains stationary.

11. In an apparatus for delivering a predetermined volume of a predetermined mixture of fluids, in combination, a pair of cylinders; a pair of pistons respectively slidable within and surrounded by said cylinders; transmission means interconnecting said pistons for transmitting the movement of one of said pistons to the other of said pistons, for moving said other piston through its suction and pressure strokes while said one piston moves through its suction stroke, and for maintaining said other piston stationary while said one piston moves through its pressure stroke; a pair of supply means respectively communicating with said cylinders for supplying a pair of different fluids thereto during the suction strokes of said pistons; first conduit means communicating with both of said cylinders for delivering the fluid discharged during the pressure stroke of said other piston into the cylinder surrounding said one piston during the suction stroke of the latter; second conduit means communicating with said latter cylinder during the pressure stroke of said one piston while said other piston remains stationary; and manually operable means operatively connected to said one piston for moving the latter in its suction stroke.

12. In an apparatus for delivering a predetermined volume of a predetermined mixture of fluids, in combination, a pair of cylinders; a pair of pistons respectively slidable within and surrounded by said cylinders; transmission means interconnecting said pistons for transmitting the movement of one of said pistons to the other of said pistons, for moving said other piston through its suction and pressure strokes while said one piston moves through its suction stroke, and for maintaining said other piston stationary while said one piston moves through its pressure stroke; a pair of supply means respectively communicating with said cylinders for supplying a pair of different fluids thereto during the suction strokes of said pistons; first conduit means communicating with both of said cylinders for delivering the fluid discharged during the pressure stroke of said other piston into the cylinder surrounding said one piston during the suction stroke of the latter; second conduit means communicating with said latter cylinder for leading the mixture of fluids away from said latter cylinder during the pressure stroke of said one piston while said other piston remains stationary; valve means in the supply means leading to the cylinder housing said one piston for admitting to the latter cylinder a fluid under pressure to act on said one piston for moving the latter in its suction stroke; spring means operatively connected to said one piston for moving the latter along its pressure stroke; and valve moving means operatively engaging said valve means for opening the latter when said one piston is at the end of its pressure stroke and for closing said valve means when said one piston is at the end of its suction stroke.

13. In an apparatus for delivering a predetermined volume of a predetermined mixture of fluids, in combination, a pair of cylinders; a pair of pistons respectively slidable within and surrounded by said cylinders; transmission means interconnecting said pistons for transmitting the movement of one of said pistons to the other of said pistons, for moving said other piston through its suction and pressure strokes while said one piston moves through its suction stroke, and for maintaining said other piston stationary while said one piston moves through its pressure stroke; a pair of supply means respectively communicating with said cylinders for supplying a pair of different fluids thereto during the suction strokes of said pistons; first conduit means communicating with both of said cylinders for delivering the fluid discharged during the pressure stroke of said other piston into the cylinder surrounding said one piston during the suction stroke of the latter; second conduit means communicating with said latter cylinder for leading the mixture of fluids away from said latter cylinder during the pressure stroke of said one piston while said other piston remains stationary; valve means in the supply means leading to the cylinder housing said one piston for admitting to the latter cylinder a fluid under pressure to act on said one piston for moving the latter in its suction stroke; spring means operatively connected to said one piston for moving the latter along its pressure stroke; valve moving means operatively engaging said valve means for opening the latter when said one piston is at the end of its pressure stroke and for closing said valve means when said one piston is at the end of its suction stroke; and means cooperating with said valve moving means for preventing the latter from closing said valve means during movement of said one piston along its suction stroke and for preventing opening of said valve means during movement of said piston along its pressure stroke.

14. In an apparatus for delivering a predetermined volume of a predetermined mixture of fluids, in combination, a pair of cylinders; a pair of pistons respectively slidable within and surrounded by said cylinders; transmission means interconnecting said pistons for transmitting the movement of one of said pistons to the other of said pistons, for moving said other piston through its suction and pressure strokes while said one piston moves through its suction stroke, and for maintaining said other piston stationary while said one piston moves through its pressure stroke; a pair of supply means respectively communicating with said cylinders for supplying a pair of different fluids thereto during the suction strokes of said pistons; first conduit means communicating with both of said cylinders for delivering the fluid discharged during the pressure stroke of said other piston into the cylinder surrounding said one piston during the suction stroke of the latter, said first conduit means communicating with the supply means which leads to said latter cylinder; and second conduit means communicating with said latter cylinder for leading the mixture of fluids away from said latter cylinder during the pressure stroke of said one piston while said other piston remains stationary.

15. In an apparatus for delivering a predetermined volume of a predetermined mixture of fluids, in combination, a first cylinder; a first piston slidable in said first cylinder away from and toward a head end of said first cylinder; a first supply conduit communicating with said head end of said first cylinder for supplying a first fluid thereto; a second cylinder having a head end communicating with said first supply conduit adjacent said head end of said first cylinder; a discharge conduit also communicating with said first supply conduit adjacent said head end of said first cylinder; valve means located at the junction between said discharge and first supply conduits for closing said discharge conduit and opening said first supply conduit during movement of said first piston away from said head end of said first cylinder and for closing a first part of said supply conduit upstream of said valve means and providing communication between said discharge conduit and a second part of said supply conduit downstream of said valve means during movement of said first piston toward said head end of said first cylinder; a second piston slidable in said second cylinder; transmission means interconnecting said first and second pistons for moving said second piston away from and toward said head end of said second cylinder during movement of said first piston away from said head end of said first cylinder; and a second supply conduit communicating with said head end of said second cylinder for supplying to the latter, during the movement of said second piston away from said head end of said second cylinder, a second fluid to be discharged from said second cylinder and mixed with the fluid in said second part of said first supply conduit and moved into said first cylinder during movement of said second piston toward said head end of said second cylinder.

16. In an apparatus as defined in claim 15, a discharge chamber communicating with said discharge conduit, said discharge conduit having a restricted free end portion leading into said chamber for further mixing the fuel delivered into said chamber.

(References on following page)

References Cited in the file of this patent

UNITED STATES PATENTS

| | | |
|---|---|---|
| 1,395,405 | Folant | Nov. 1, 1921 |
| 1,724,766 | McCauley | Aug. 13, 1929 |
| 1,931,818 | Hartman | Oct. 24, 1933 |
| 2,057,226 | Bleeker | Oct. 13, 1936 |
| 2,065,128 | Eisinger | Dec. 22, 1936 |
| 2,538,111 | Luster | Jan. 16, 1951 |
| 2,638,247 | Taylor | May 12, 1953 |

FOREIGN PATENTS

| | | |
|---|---|---|
| 68,030 | Denmark | Nov. 15, 1948 |